United States Patent
Zhao et al.

(10) Patent No.: US 11,425,445 B2
(45) Date of Patent: Aug. 23, 2022

(54) DISPLAY DEVICE, DISPLAY METHOD, PROJECTOR, AND RECORDING MEDIUM

(71) Applicant: Panasonic Intellectual Property Management Co., Ltd., Osaka (JP)

(72) Inventors: Guojie Zhao, Guangdong (CN); Jiayi Zhao, Guangdong (CN)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 28 days.

(21) Appl. No.: 17/152,087

(22) Filed: Jan. 19, 2021

(65) Prior Publication Data
US 2021/0235145 A1    Jul. 29, 2021

(30) Foreign Application Priority Data
Jan. 23, 2020   (CN) .......................... 202010076660.3

(51) Int. Cl.
*H04N 21/422*   (2011.01)
*G08C 23/04*    (2006.01)

(52) U.S. Cl.
CPC ....... *H04N 21/42226* (2013.01); *G08C 23/04* (2013.01); *H04N 21/42208* (2013.01); *H04N 21/42222* (2013.01)

(58) Field of Classification Search
CPC ....... H04N 21/42226; H04N 21/42222; G08C 23/04
USPC ........................................................ 348/734
See application file for complete search history.

(56) References Cited

U.S. PATENT DOCUMENTS

| | | | | |
|---|---|---|---|---|
| 5,604,544 A | * | 2/1997 | Bertram | H04N 21/482 345/158 |
| 5,936,611 A | * | 8/1999 | Yoshida | H04N 21/47 345/169 |
| 6,501,516 B1 | * | 12/2002 | Clapper | H04N 21/47 345/169 |
| 8,823,881 B2 | * | 9/2014 | Chang | H04N 21/42227 348/576 |
| 2005/0253808 A1 | | 11/2005 | Yoshida | |
| 2006/0287851 A1 | * | 12/2006 | Kida | H04N 21/4221 348/E5.103 |
| 2010/0265413 A1 | * | 10/2010 | Seo | H04N 21/42204 370/313 |
| 2011/0310300 A1 | | 12/2011 | Wakisaka | |

(Continued)

FOREIGN PATENT DOCUMENTS

| | | |
|---|---|---|
| JP | 9-130695 | 5/1997 |
| JP | 2001-238146 | 8/2001 |

(Continued)

*Primary Examiner* — John W Miller
*Assistant Examiner* — Omer Khalid
(74) *Attorney, Agent, or Firm* — Wenderoth, Lind & Ponack, L.L.P.

(57) ABSTRACT

A display device displays a guidance display for guiding a control operation on a display screen when receiving the control operation. The display device includes an operation source determination part that determines a source of the control operation based on the control operation received and a guidance display generator that, according to the determined source, displays the guidance display corresponding to the source on the display screen.

9 Claims, 9 Drawing Sheets

(56) References Cited

U.S. PATENT DOCUMENTS

2012/0161928 A1\* 6/2012 Cheng .................... G05B 15/02
                                                                        340/6.1
2019/0306477 A1\* 10/2019 Nordback ............ H04N 9/3182

FOREIGN PATENT DOCUMENTS

| JP | 2004-207872 | 7/2004 |
| --- | --- | --- |
| JP | 2012-9924 | 1/2012 |

\* cited by examiner

FIG. 2A
FIG. 2B
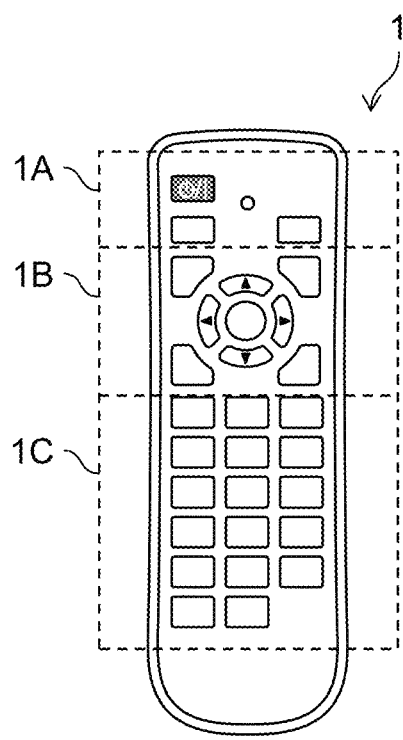
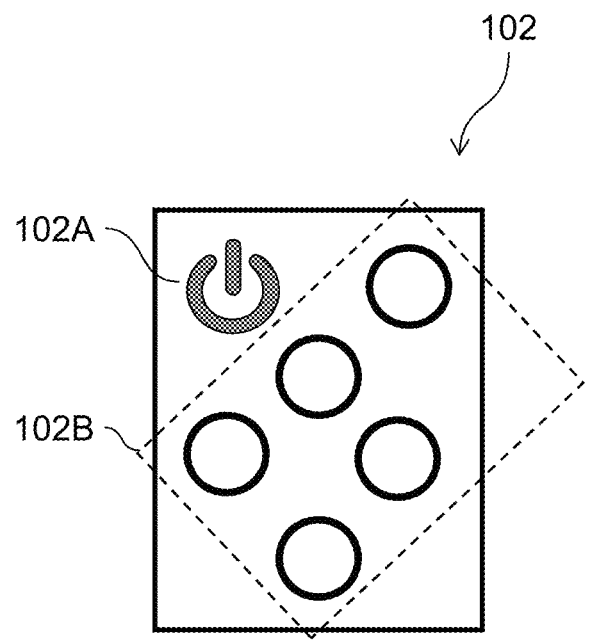

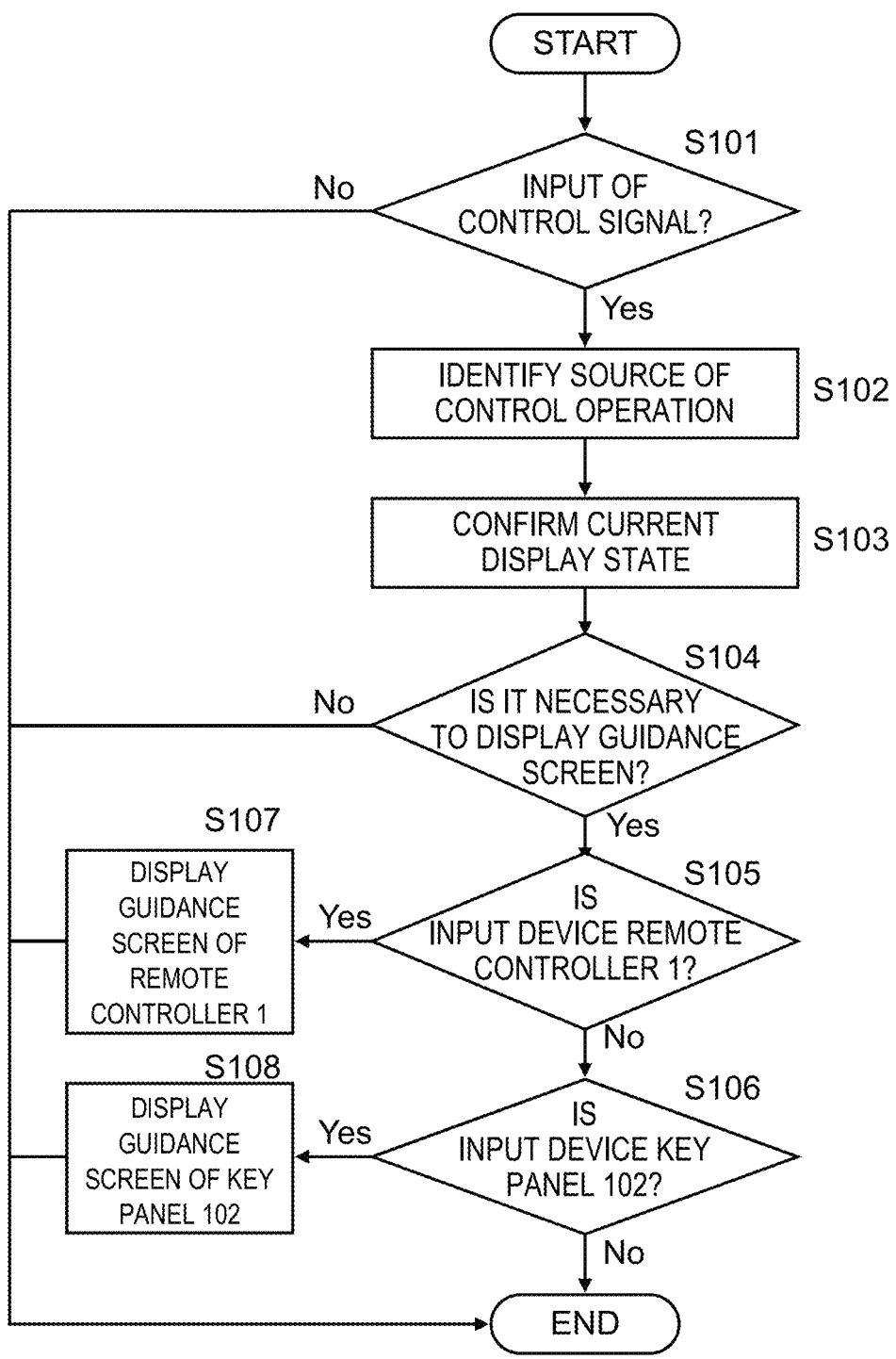

FIG. 9
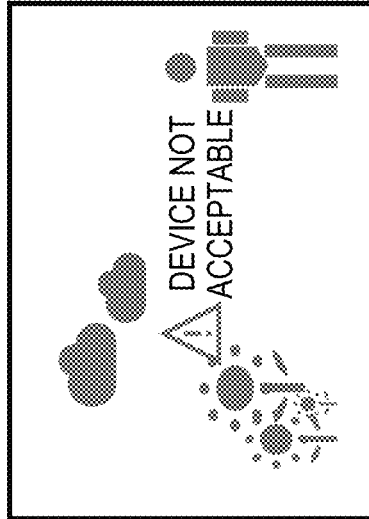
Notify that the input device cannot be recognized
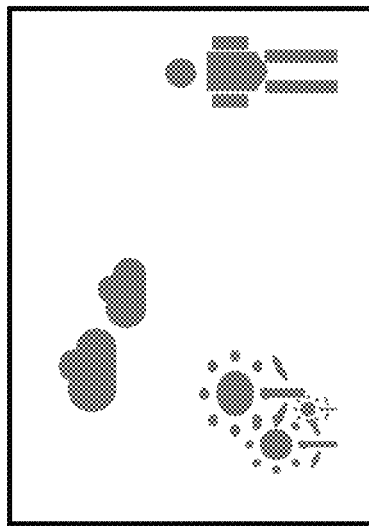
Operation by an unrecognizable input device
There is no control operation input

DISPLAY DEVICE, DISPLAY METHOD, PROJECTOR, AND RECORDING MEDIUM

BACKGROUND

1. Technical Field

The present invention relates to a display device, a display method, a projector, and a recording medium.

2. Description of the Related Art

Conventionally, there are various display devices such as televisions, and buttons for operating such a device are installed on a housing of the device. In order to clearly understand functions of these buttons when a user operates these buttons, the conventional technique provides a display device capable of an operation guide display (OSD) as in PTL 1 (Unexamined Japanese Patent Publication No. 2001-238146). As a display device capable of providing such an operation guide, a display device that imparts a plurality of functions to the same button is provided. When one button has a plurality of functions, in order for the user to clearly understand the function of the button in a current scene, for example, there is provided a display device that displays different contents in a current operation pattern as in PTL 2 (Unexamined Japanese Patent Publication No. 2012-9924).

However, the display device may be controlled by a controller installed away from a device body such as a remote controller, in addition to the buttons installed on the housing. In this case, the operation guide displayed in response to the operation of the button installed on the housing is not a proper guide for an operation by a remote controller or the like, and there is a room for improvement.

SUMMARY

The present invention has been made in view of the above, and an object of the present invention is to provide a display device, a display method, a projector, and a recording medium capable of providing a suitable operation guide display for operations by different means.

A first aspect of the present invention is a display device that displays a guidance display for guiding a control operation on a display screen when receiving the control operation. The display device includes an operation source determination part that determines a source of the control operation based on the control operation received and a guidance display generator that, according to the determined source, displays the guidance display corresponding to the source on the display screen.

A second aspect of the present invention is a projector including the above display device.

A third aspect of the present invention is a display method in which a display device displays a guidance display for guiding a control operation on a display screen. The display method includes an operation source determination step of determining a source of the control operation based on the control operation received by the display device and a guidance display generation step of, according to the source determined, displaying the guidance display, corresponding to the source, on the display screen.

A fourth aspect of the present invention is a recording medium recorded with a program for causing, in order to display a guidance display for guiding a control operation on a display screen by a display device, a central processing unit (CPU) in the display device to execute an operation source determination step of determining a source of the control operation based on the control operation received by the display device and a guidance display generation step of, according to the source determined, displaying the guidance display, corresponding to the source, on the display screen.

According to the present invention, it is possible to provide a suitable operation guide display for operations by different means.

BRIEF DESCRIPTION OF THE DRAWINGS

FIG. 2A is a schematic diagram illustrating a layout of remote controller 1;

FIG. 2B is a schematic diagram illustrating a layout of key panel 102;

FIG. 3 is a flowchart illustrating an OSD display generation flow of projector 10 of the first exemplary embodiment;

FIG. 9 is a diagram showing an example of a display screen according to a modification of the present invention.

DETAILED DESCRIPTION

Hereinafter, the present invention will be described in detail with reference to the drawings.

First Exemplary Embodiment

Figure 1:
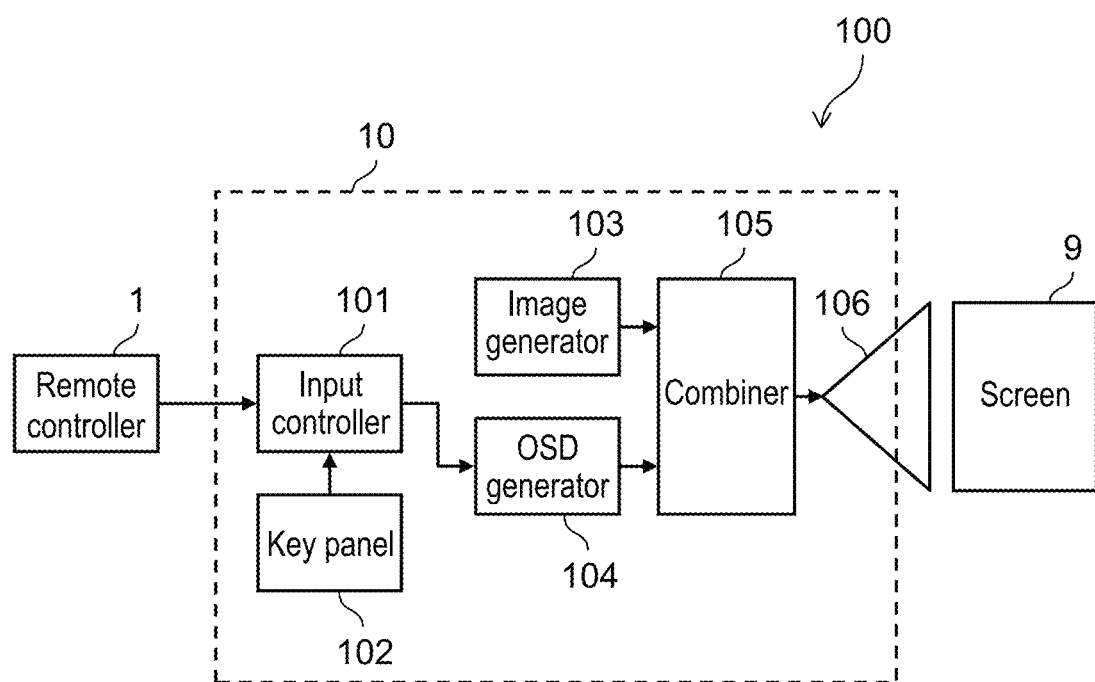
FIG. 1 is a block diagram of a structure of projector system 100 of a first exemplary embodiment of the present invention.

FIG. 1 is a block diagram of a structure of projector system 100 of a first exemplary embodiment of the present invention. Projector system 100 includes projector 10, remote controller 1 that controls projector 10, and screen 9 on which an image from projector 10 is projected. Projector 10 is an example of a display device.

Remote controller 1 is an infrared remote controller that controls projector 10 by emitting an infrared signal. However, the present invention is not limited to this, as long as an independent device that is disposed away from projector 10 and can transmit a remote control signal to projector 10 is used, the remote control signal may be transmitted by any other method. For example, wireless communication based on a protocol such as wifi, Bluetooth (registered trademark), or zigbee, or wired communication by connecting with a data line such as a universal serial bus (USB) line may be used. Remote controller 1 is a remote controller and is an example of a controller.

FIG. 2A is a schematic diagram illustrating a layout of remote controller 1. As shown in FIG. 2A, remote controller 1 includes basic control region 1A, selection control region 1B, and enhanced control region 1C. Basic control region 1A is a region where buttons that control basic functions such as turning on/off projector 10 and switching a data source are disposed, and includes, for example, a power key, a data source selection key, a mute key, and the like. Selection control region 1B is a region where a navigation key, which is a key for a user to select an operation to be performed by projector 10 while the user refers to a guide display, is disposed, and includes a cross key, a confirmation key, a cancel key, a return key, an assist key, and the like. Enhanced control region 1C is a region where keys related to additional functions for projector 10 are disposed, and includes, for example, keys for adjusting an aspect ratio, adjusting contrast, and adjusting sharpness. In this exemplary embodiment, since a number of keys that can be disposed on remote controller 1 is limited, it is possible to impart a plurality of functions to some of the keys.

The description is continued by returning to FIG. 1. Projector 10 is a device that displays an image represented by an image signal by projecting an image signal from the outside or an image signal generated inside to the outside. Projector 10 includes input controller 101, key panel 102, image generator 103, OSD generator 104, combiner 105, and image projection part 106.

Key panel 102 is provided on a main body of projector 10, receives an input operation from the user, and transmits a control signal, corresponding to the input operation, to input controller 101.

FIG. 2B is a schematic diagram illustrating a layout of key panel 102. As shown in FIG. 2B, key panel 102 includes power key 102A and operation key region 102B. Operation key region 102B is a region where a navigation key, which is a key for the user to select the operation to be performed by projector 10 while the user refers to the guide display, is disposed, and the navigation key includes a cross key, a confirmation key, and the like. Here, since the number of keys that can be disposed on key panel 102 is limited, it is possible to impart a plurality of functions to some of the keys.

The description is continued by returning to FIG. 1. Input controller 101 receives the control signal from remote controller 1 or key panel 102, and recognizes what kind of command the received control signal gives to projector 10. Examples of the command include selection for image preference (PICTURE), display adjustment (DISPLAY), setting (SETUP), and function (FUNCTION).

OSD generator 104 generates a guide display (OSD) that guides user's operation based on a signal from input controller 101. The guide display is for presenting the current operation content to the user who performs a control operation, and/or for guiding a possible operation content from these with the guidance display. The details of a specific method of generating the guide display will be described later. OSD generator 104 is an example of a guidance display generator.

Image generator 103 generates various display images such as videos and photographs displayed by projector 10. The image generated by image generator 103 is generated based on data input from the outside such as a personal computer, a mobile phone, a tablet, a video player, a digital camera, or a digital video camera connected to projector 10. The display image is generated by decoding data, provided via a network, a USB interface, or the like, by a decoder built in projector 10.

Combiner 105 combines the display image generated by image generator 103 and the guide display generated by OSD generator 104, and generates a projection image in which the guide display is superimposed on the display image.

Image projection part 106 projects the projection image generated by combiner 105 to the outside of projector 10. Image projection part 106 includes a light source, an imaging panel, an optical lens system, and the like, which are not shown, and can use a known structure that has been widely used conventionally, such as 3LCD, DLP, and LCOS.

Screen 9 receives an image projected from projector 10 and displays the projection image projected by projector 10. The screen can be a screen used in combination with a projector, such as a frame screen or a retractable screen. It is also possible to use a screen formed from a fluid such as smoke or water. A wall surface or the like may be used as screen 9 without installing a dedicated screen.

FIG. 3 is a flowchart illustrating an OSD display generation flow of projector 10 of the first exemplary embodiment.

After start (START) of the flow, in step S101, it is confirmed whether or not the user has performed the input operation for inputting the control signal to projector 10 after preparation of projector 10 is completed. Specifically, input controller 101 determines whether or not the input operation (main body operation) from remote controller 1 or the input operation (control operation) from key panel 102 has been received. When the input operation is not received, the flow is terminated (END), and the state is returned to a detection state of the input of the control signal. On the other hand, when the input of the control signal is confirmed, the process proceeds to step S102.

In step S102, input controller 101 identifies a source of the control operation (operation source determination step) and functions as an operation source determination part. Specifically, for example, the source of the control operation can be identified based on characteristics of the received control signal. For example, it is judged whether the control operation is from remote controller 1 or key panel 102 based on whether the received control signal is a control signal via infrared rays or a control signal via an internal circuit of projector 10, and a fixed identification number (ID) is assigned to the source of this control operation. After that, the process proceeds to step S103.

In step S103, the current display state is confirmed. For example, an operation stage and an operation target indicated by the guide display currently displayed by projector 10 are confirmed. After that, the process proceeds to step S104.

In step S104, it is determined whether or not it is necessary to display the guidance display based on the confirmed current display state. If it is not necessary to display the guidance display, the flow is terminated (END), and the state is returned to the detection state of the input of the control signal. If it is necessary to display the guidance display, the flow proceeds to step S105. The guidance display is a screen that guides the user such that a control signal input source during operation, for example, remote controller 1 or key panel 102 can be intuitively operated. In the present invention, the guidance display preferably includes a layout image for showing an operation key used for the operation. Details will be described later.

In step S105, it is judged whether or not an input device is remote controller 1 based on the identification number (ID) of the source of the control operation determined in step S102, or the like. If it is determined that the input device is remote controller 1, the flow proceeds to step S107, and if not, the flow proceeds to step S106.

In step S107, the guidance display of remote controller 1 is displayed (guidance display generation step), this flow is terminated (END), and the state is returned to the detection state of the input of the control signal. As the guidance display of remote controller 1, it is preferable to display the guidance display corresponding to a key layout of selection control region 1B. Since remote controller 1 usually has many keys, displaying only the key layout of the keys in selection control region 1B makes it convenient for the user to select the operation to be performed by projector 10 while the user refers to the guide display, and, at the same time, the guidance display of remote controller 1 becomes simple and clear as a whole.

In step S106, it is judged whether or not the input device is key panel 102 based on the identification number (ID) of the source of the control operation determined in step S102, or the like. If it is determined that the input device is key panel 102, the flow proceeds to step S108. If not, the flow is terminated (END), and the state is returned to the detection state of the input of the control signal.

In step S108, the guidance display of key panel 102 is displayed (guidance display generation step), this flow is terminated (END), and the state is returned to the detection state of the input of the control signal. The guidance display of key panel 102 is preferably a guidance display corresponding to the layout of all the keys including power key 102A and operation key region 102B. Since key panel 102 usually has few keys, by displaying the layout of all the keys on key panel 102, the user can more surely understand the position of the key to be operated by referring to the guidance display.

Figure 4:
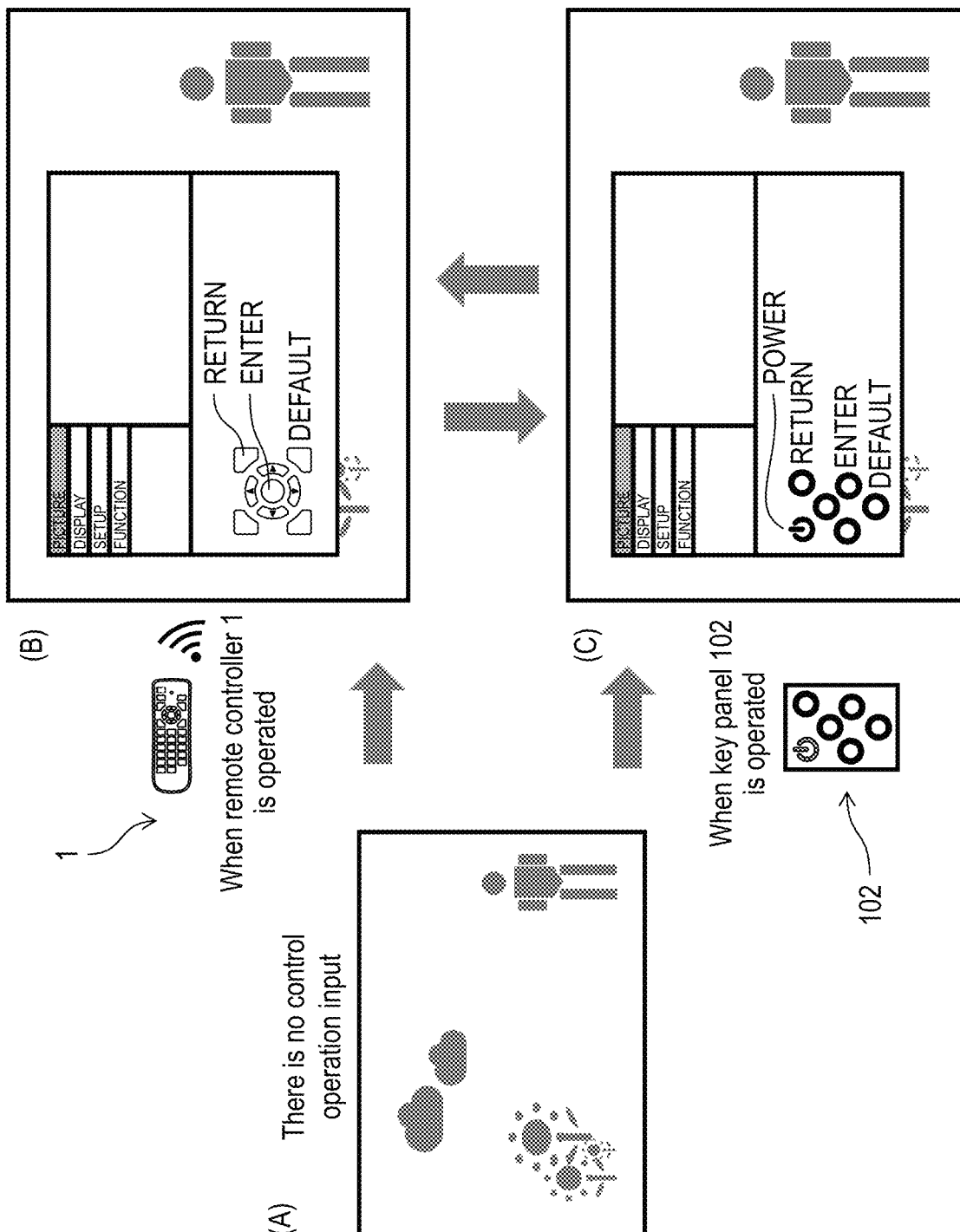
FIG. 4 is a diagram showing an example of a display screen of projector 10 according to the first exemplary embodiment.

FIG. 4 is a diagram showing an example of a display screen of projector 10 according to the first exemplary embodiment. Part (A) of FIG. 4 shows an example of the display screen of projector 10 when there is no control operation input. Part (B) of FIG. 4 is a diagram showing an example of the display screen when the control operation is performed using remote controller 1. Part (C) of FIG. 4 is a diagram showing an example of the display screen when the control operation is performed using key panel 102. As shown in part (B) and part (C) of FIG. 4, in the first exemplary embodiment, a guide screen corresponding to the source of the control operation is displayed on the display screen based on whether the source of the identified control operation is remote controller 1 or key panel 102. In part (B) of FIG. 4, the layout image showing the layout of the keys located in selection control region 1B of remote controller 1 is displayed on the display screen. In part (C) of FIG. 4, the layout image showing the layout of all the keys on key panel 102 is displayed on the display screen. As a result, the user can intuitively operate an operating device being used while referring to a displayed operation guide.

When key panel 102 is operated in the state of part (B) of FIG. 4, the layout image of all the keys on key panel 102 is displayed on the display screen as shown in part (C) of FIG. 4. When remote controller 1 is operated in the state of part (C) of FIG. 4, the layout image of the keys of remote controller 1 located in selection control region 1B is displayed on the display screen as shown in part (B) of FIG. 4.

Second Exemplary Embodiment

Figure 5:
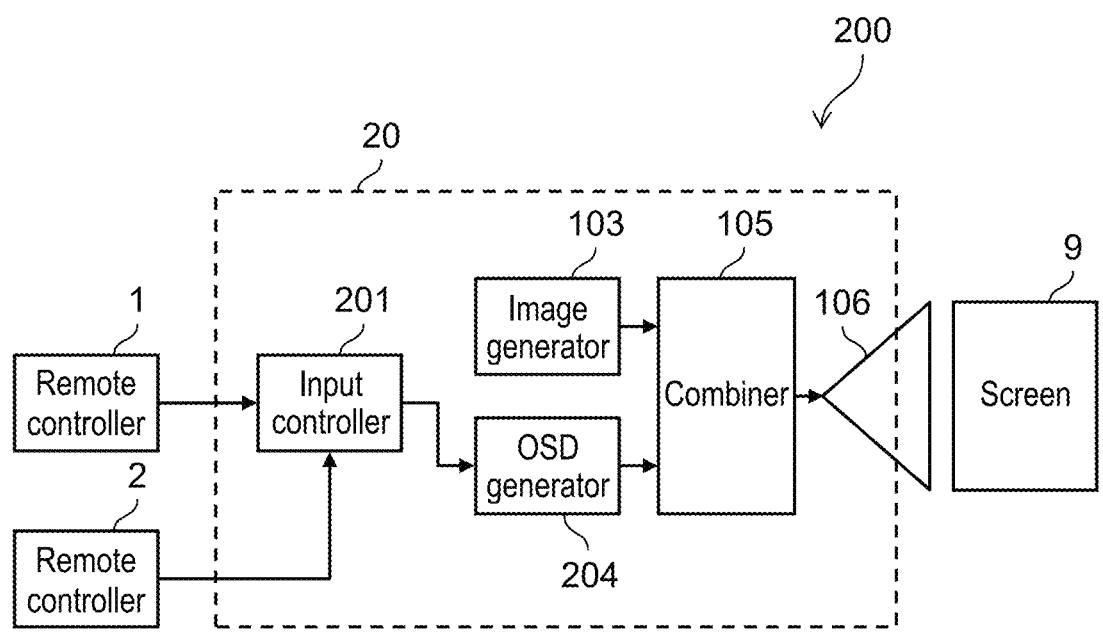
FIG. 5 is a block diagram of a structure of projector system 200 of a second exemplary embodiment of the present invention.

FIG. 5 is a block diagram of a structure of projector system 200 according to a second exemplary embodiment of the present invention. In description of projector system 200 according to the second exemplary embodiment, differences between projector system 200 and projector system 100 will be mainly described. The same reference numerals are given to the same parts as the structure of projector system 100 of the first exemplary embodiment, and duplicate description will be omitted.

Projector system 200 includes projector 20, remote controller 1 and remote controller 2 that control projector 20, and screen 9 that receives an image projected from projector 20. Projector 20 is an example of a display device.

Remote controller 2 has a key layout different from that of remote controller 1, and is, for example, an infrared remote controller that controls projector 20 by emitting an infrared signal. However, the present invention is not limited to this, as long as an independent device that is disposed away from projector 20 and can transmit a remote control signal to projector 20 is used, the remote control signal may be transmitted by any other method. For example, wireless communication based on a protocol such as wifi, Bluetooth, or zigbee, or wired communication by connecting with a data line such as a USB line may be used. Remote controller 2 may transmit the remote control signal to projector 20 in the same manner as remote controller 1, or may use a different method. Remote controller 2 is a remote controller and is an example of a controller.

Figure 6:
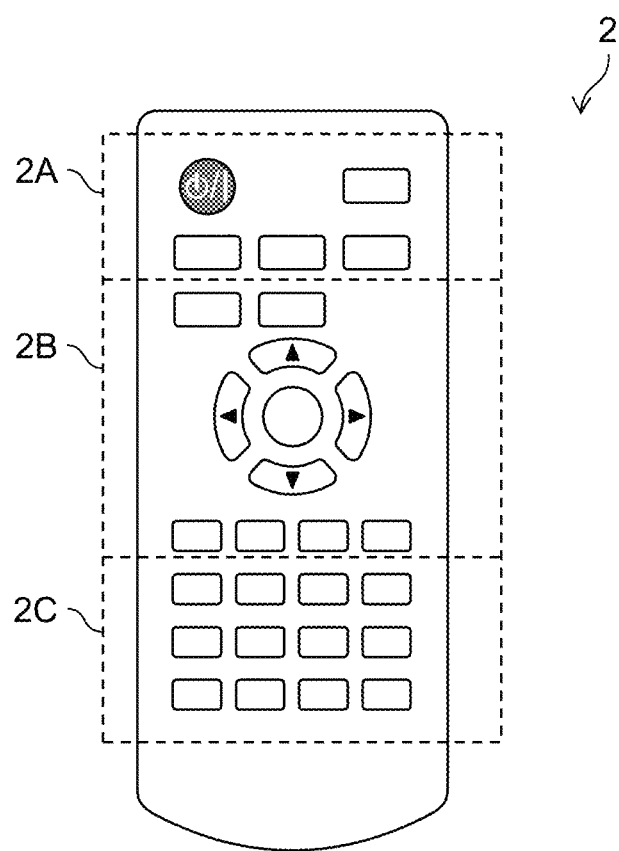
FIG. 6 is a schematic diagram illustrating a layout of remote controller 2.

FIG. 6 is a schematic diagram illustrating a layout of remote controller 2. As shown in FIG. 6, remote controller 2 includes basic control region 2A, selection control region 2B, and enhanced control region 2C, similarly to remote controller 1. Since basic control region 2A, selection control region 2B, and enhanced control region 2C of remote controller 2 are the same as basic control region 1A, selection control region 1B, and enhanced control region 1C of remote controller 1, respectively, the description thereof will be omitted here.

The description is continued by returning to FIG. 5. Projector 20 includes input controller 201 and OSD generator 204 instead of input controller 101 and OSD generator 104 as a difference from projector 10.

Input controller 201 receives the control signal from remote controller 1 or 2, and recognizes what kind of command the received control signal gives to projector 20.

OSD generator 204 generates a guide display (OSD) that guides user's operation based on a signal from input controller 201. The guide display is for presenting the current operation content to the user who performs a control operation, and/or for guiding a possible operation content from these with the guidance display. The details of a specific method of generating the guide display will be described later. OSD generator 204 is an example of a guidance display generator.

Figure 7:
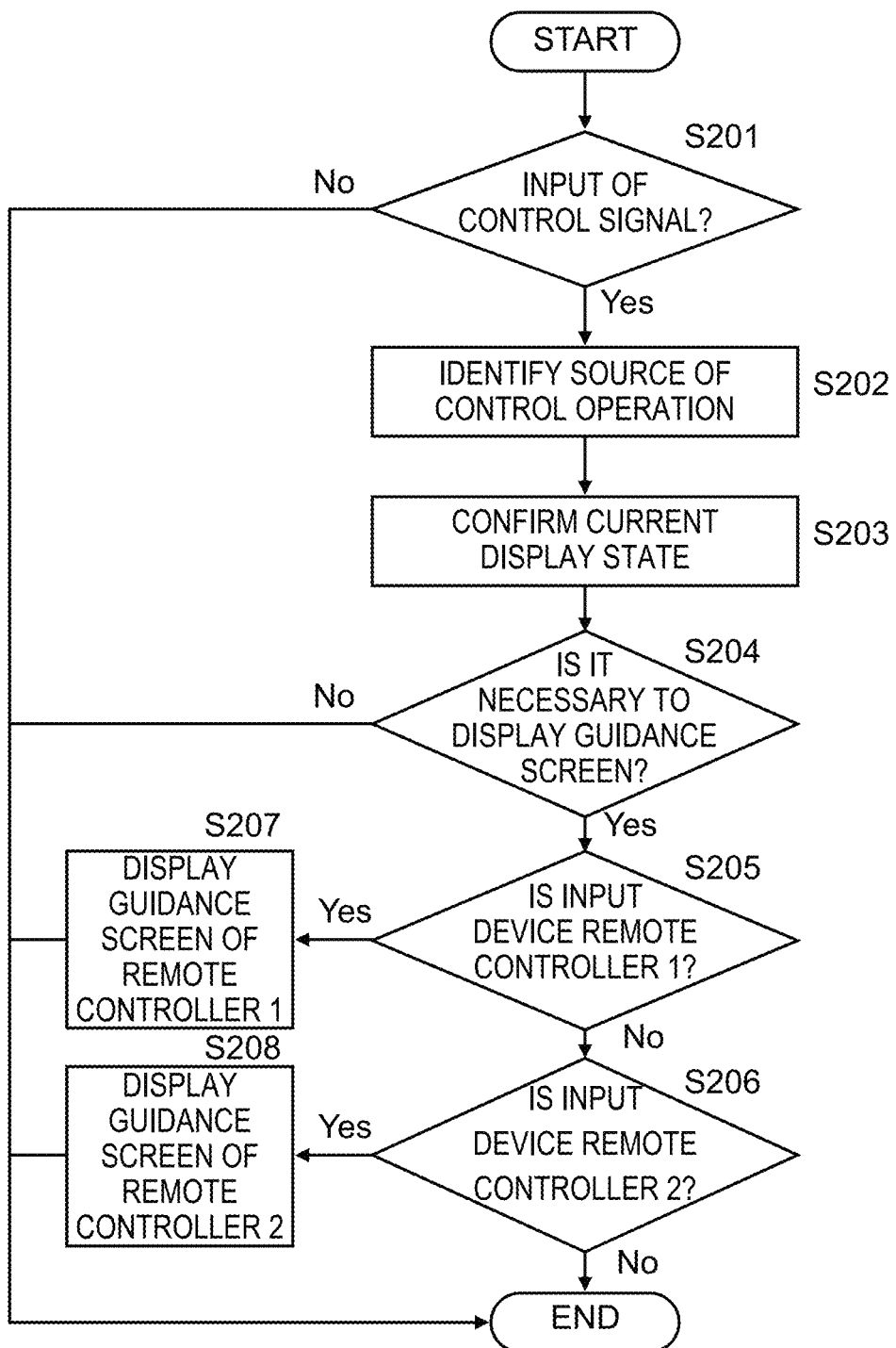
FIG. 7 is a flowchart illustrating an OSD display generation flow of projector 20 of the second exemplary embodiment.

FIG. 7 is a flowchart illustrating an OSD display generation flow of projector 20 of the second exemplary embodiment.

After start (START) of the flow, in step S201, it is confirmed whether or not the user has performed the input operation for inputting the control signal to projector 20 after preparation of projector 20 is completed. Specifically, input controller 201 determines whether or not the input operation (control operation) from remote controller 1 or remote controller 2 has been received. When the input operation is not received, the flow is terminated (END), and the state is returned to a detection state of the input of the control signal. On the other hand, when the input of the control signal is confirmed, the process proceeds to step S202.

In step S202, input controller 101 identifies a source of the control operation (operation source determination step) and functions as an operation source determination part. Specifically, for example, the source of the control operation can be specified based on the characteristics of the received control signal. For example, a feature code of a head of the received control signal is used to identify whether the control signal is from remote controller 1 or remote controller 2, and a fixed identification number (ID) is assigned to the source of this control operation. After that, the process proceeds to step S203.

In step S203, the current display state is confirmed. For example, an operation stage and an operation target indicated by the guide display currently displayed by projector 20 are confirmed. After that, the process proceeds to step S204.

In step S204, it is determined whether or not it is necessary to display the guidance display based on the confirmed current display state. If it is not necessary to display the guidance display, the flow is terminated (END), and the state is returned to the detection state of the input of the control signal. If it is necessary to display the guidance display, the flow proceeds to step S205. The guidance display is a screen that guides the user such that a control signal input source during operation, for example, remote controller 1 or remote controller 2 can be intuitively operated. In the present invention, the guidance display preferably includes a layout image for showing an operation key used for the operation. Details will be described later.

In step S205, it is judged whether or not an input device is remote controller 1 based on the identification number (ID) of the source of the control operation determined in step S202, or the like. If it is determined that the input device is remote controller 1, the flow proceeds to step S207, and if not, the flow proceeds to step S206.

In step S207, the guidance display of remote controller 1 is displayed (guidance display generation step). Then, this flow is terminated (END), and the state is returned to the detection state of the input of the control signal. Since the explanation of the guidance display of remote controller 1 is the same as the explanation of the first exemplary embodiment, the explanation will be omitted.

In step S206, it is judged whether or not an input device is remote controller 2 based on the identification number (ID) of the source of the control operation determined in step S202, or the like. If it is determined that the input device is remote controller 2, the flow proceeds to step S208. If not, the flow is terminated (END), and the state is returned to the detection state of the input of the control signal.

In step S208, the guidance display of remote controller 2 is displayed (guidance display generation step). Then, this flow is terminated (END), and the state is returned to the detection state of the input of the control signal. As the guidance display of remote controller 2, it is preferable to display the guidance display similar to the guidance display of remote controller 1, that is, the guidance display corresponding to a key layout of selection control region 2B. Since remote controller 2 usually has many keys, displaying only the key layout of the keys in selection control region 2B makes it convenient for the user to select the operation to be performed by projector 20 while the user refers to the guide display, and, at the same time, the guidance display of remote controller 2 becomes simple and clear as a whole.

Figure 8:
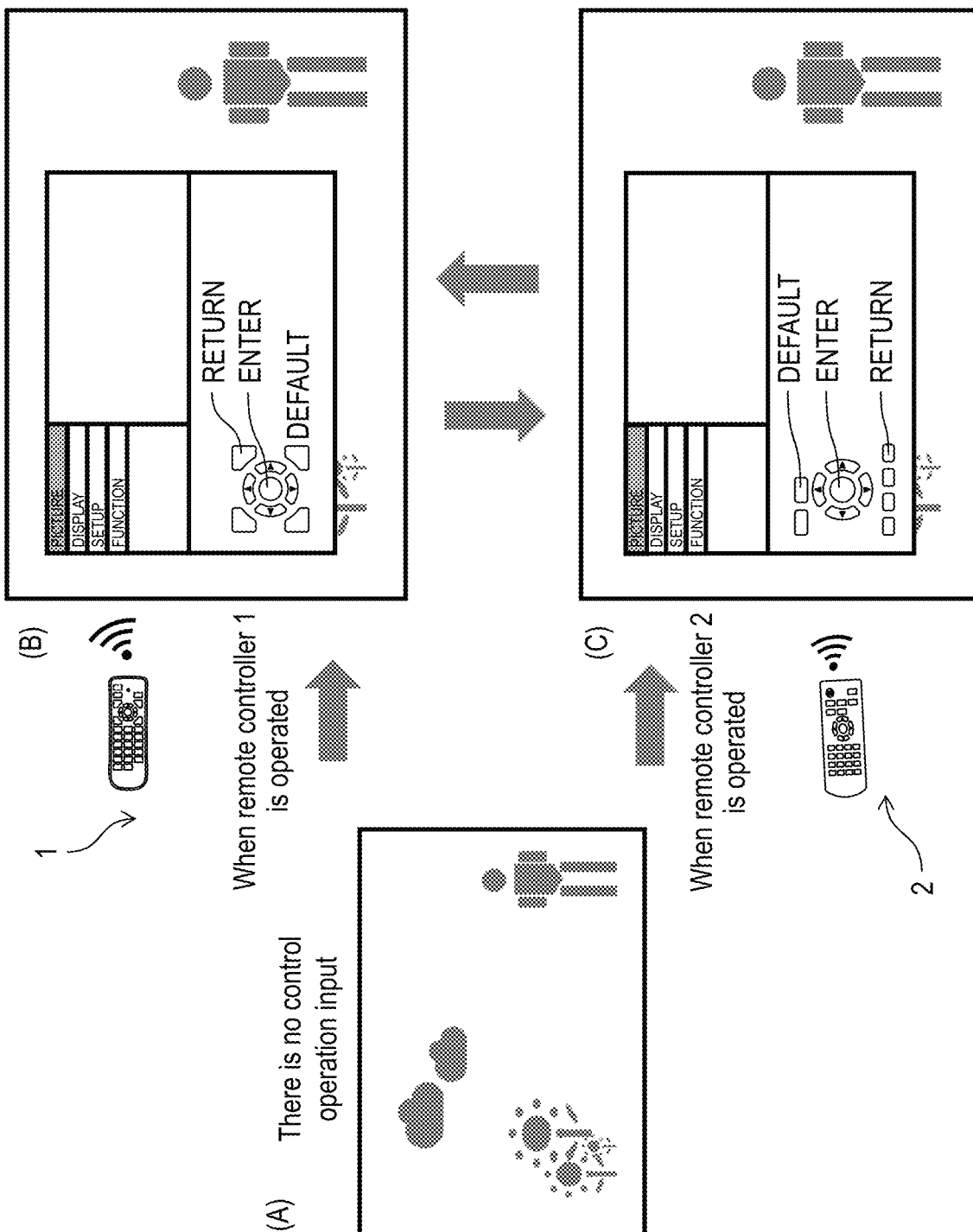
FIG. 8 is a diagram showing an example of a display screen of projector 20 according to the second exemplary embodiment.

FIG. 8 is a diagram showing an example of a display screen of projector 20 according to the second exemplary embodiment. Part (A) of FIG. 8 shows an example of the display screen of projector 20 when there is no control operation input. Part (B) of FIG. 8 is a diagram showing an example of the display screen when the control operation is performed using remote controller 1. Part (C) of FIG. 8 is a diagram showing an example of the display screen when the control operation is performed using remote controller 2. As shown in part (B) and part (C) of FIG. 8, in the second exemplary embodiment, a guide screen corresponding to the source of the control operation is displayed on the display screen based on whether the source of the identified control operation is remote controller 1 or remote controller 2. In part (B) of FIG. 8, the layout image showing the layout of the keys located in selection control region 1B of remote controller 1 is displayed on the display screen. In part (C) of FIG. 8, the layout image showing the layout of the keys located in selection control region 2B of remote controller 2 is displayed on the display screen. As a result, the user can intuitively operate an operating device being used while referring to the displayed guide screen.

(Modification)

A notification step may be additionally included after step S106 of the first exemplary embodiment. That is, when input controller 101 judges that the input device (source) whose control operation is performed based on the identification number or the like is neither remote controller 1 nor key panel 102, input controller 101 displays, on the display screen, the fact that the current input device cannot be recognized and notifies the user. In this case, input controller 101 functions as a notification part. FIG. 9 is a diagram showing an example of a display screen according to a modification of the present invention.

In this modification, when the input device cannot be recognized, the user is notified of the fact, so that the user can recognize that the input device being used cannot be used for controlling the projector. However, the present invention is not limited to this, and the user may be notified that there is no guide screen that can be displayed. This modification can be also applied to the second exemplary embodiment.

Although the exemplary embodiments and modification of the present invention have been specifically described above, the scope of the present invention is not limited thereto. Each of the above exemplary embodiments and modification can be combined with each other as those skilled in the art can understand. For example, the projector of the present invention can include a key panel, determine whether the input device is one of the three input devices: remote controller 1, remote controller 2, and key panel 3, and display the corresponding guide screen based on the determination result.

The layout of remote controller 1 and remote controller 2 has been described, but the layout is not limited to this. The layout of remote controllers 1, 2 is arbitrary and may have two or four or more key regions. As the guide display of the remote controller, the layout corresponding to two or more key regions may be displayed.

The above description has been given by taking remote controller 1 and remote controller 2 as examples, but the present invention is not limited thereto. The projector may be capable of recognizing three or more types of remote controllers and displaying the corresponding guide displays.

In the above description, the configuration of projector 10 has been described by taking hardware as an example. However, each hardware module is not necessarily an independent entity structure, and may be achieved by linking a CPU with software and hardware. For example, a recording medium on which a program capable of achieving these functions is recorded is provided.

INDUSTRIAL APPLICABILITY

The present invention has been described by taking projector 10 as an example, but the present invention is not limited thereto. The present invention can be applied to any display device as long as the display device can display an image.

What is claimed is:

1. A display system that displays a guidance display for guiding a control operation on a display screen when receiving the control operation, the display system comprising:
 a display device comprising:
 an operation source determination part that determines whether a source of the control operation is a first source or a second source, based on the control operation received; and
 a guidance display generator that:
 displays, on the display screen, a first guidance display corresponding to the first source, in response to a determination that the source of the control operation is the first source,
 displays, on the display screen, a second guidance display different from the first guidance display and corresponding to the second source, in response to a determination that the source of the control operation is the second source; and
 a projector including the display device, the projector comprising:
 a key panel provided on a main body of the projector,
 wherein the first source is a remote controller,
 the second source is the key panel,
 the first guidance display, displayed on the display screen, includes a layout image showing a layout of keys of the remote controller, and
 the second guidance display, displayed on the display screen, includes a layout image showing a layout of keys of the key panel.

2. The display system according to claim 1, wherein the control operation includes a main body operation performed by a key installed on a main body of the display device.

3. The display system according to claim 1, wherein the control operation includes a controller operation performed by a controller disposed away from the display device.

4. The display system according to claim 3, wherein the controller operation is performed from a first controller or a second controller having a key layout different from a key layout of the first controller.

5. The display system according to claim 1, wherein the guidance display includes a layout image showing a layout of an operation key used for the control operation.

6. The display system according to claim 3, wherein
 the guidance display includes a layout image showing a layout of an operation key used for operation, and
 the layout image in the guidance display corresponding to the controller operation includes only a region where a navigation key in the controller is disposed.

7. The display system according to claim 1, further comprising a notification part that notifies that the source of the control operation cannot be recognized by display when the source of the control operation cannot be recognized.

8. A display method in which a display system including a display device and a projector including the display device displays a guidance display for guiding a control operation on a display screen, the display method comprising:
 an operation source determination step of determining whether a source of the control operation is a first source or a second source, based on the control operation received by the display device;
 a guidance display generation step of:
 displaying, on the display screen, a first guidance display corresponding to the first source, in response to a determination that the source of the control operation is the first source, and
 displaying, on the display screen, a second guidance display different from the first guidance display and corresponding to the second source, in response to a determination that the source of the control operation is the second source; and
 wherein a key panel is provided on a main body of the projector,
 the first source is a remote controller,
 the second source is the key panel,
 the first guidance display, displayed on the display screen, includes a layout image showing a layout of keys of the remote controller, and
 the second guidance display, displayed on the display screen, includes a layout image showing a layout of keys of the key panel.

9. A non-transitory computer-readable recording storage medium configured to store a program, which when executed by a central processing unit (CPU) of a display device included in a projector causes, in order to display a guidance display for guiding a control operation on a display screen by the display device, the CPU in the display device to execute steps comprising:
 an operation source determination step of determining whether a source of the control operation is a first source or a second source, based on the control operation received by the display device; and
 a guidance display generation step of:
 displaying, on the display screen, a first guidance display corresponding to the first source, in response to a determination that the source of the control operation is the first source, and
 displaying, on the display screen, a second guidance display different from the first guidance display and corresponding to the second source, in response to a determination that the source of the control operation is the second source,
 wherein a key panel is provided on a main body of the projector,
 the first source is a remote controller,
 the second source is the key panel,
 the first guidance display, displayed on the display screen, includes a layout image showing a layout of keys of the remote controller, and
 the second guidance display, displayed on the display screen, includes a layout image showing a layout of keys of the key panel.

* * * * *